United States Patent Office 3,414,582
Patented Dec. 3, 1968

---

3,414,582
4-(DIALKYLAMINOETHOXYPHENYL) PYRAZOLES
Marcel Descamps, 28 Avenue de Crainhem, Crainhem, Belgium, and Fernand Binon, Brussels, Belgium (141 Avenue Ste Anne, Stroombeek-Bever, Belgium)
No Drawing. Continuation-in-part of application Ser. No. 362,469, Apr. 24, 1964. This application Apr. 13, 1966, Ser. No. 542,200
Claims priority, application Great Britain, Apr. 30, 1963, 17,050/63, 17,051/63
8 Claims. (Cl. 260—310)

ABSTRACT OF THE DISCLOSURE 4-(dialkylaminoethoxyphenyl) pyrazoles and their method of preparation. The compounds have anti-inflammatory, anti-oedematous and analgesic activity.

---

This application is a continuation-in-part application of our earlier application, Ser. No. 362,469 filed April 24, 1964 which application is now abandoned.

This invention relates to new substituted pyrazole derivatives represented by the general formula:

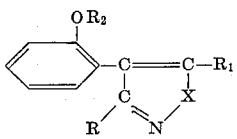

I wherein X is NH or N—CH$_3$; R is methyl, ethyl, n-butyl, phenyl or benzyl; R$_1$ is methyl, phenyl, 4-methoxyphenyl, 3,4,5-trimethoxyphenyl or 2-methoxyphenyl and R$_2$ is β-N-dimethylaminoethyl, β-N-diethylaminoethyl, β-N-di-n-butylaminoethyl, β-N-di-n-butylaminoisopropyl or γ-N-dimethylaminopropyl.

The preferred compounds of Formula I are those in which R is ethyl, R$_1$ is 4-methoxyphenyl and R$_2$ is β-N-diethylaminoethyl as well as those in which R is phenyl, R$_1$ is methyl and R$_2$ is β-N-dimethylaminoethyl, β-N-diethylaminoethyl, β-N-di-n-butylaminopropyl or γ-N-dimethylaminopropyl, X in all cases being considered as being NH.

The compounds of Formula I may be prepared by reacting an alkali-metal salt, preferably the sodium or potassium salt, of a compound of the general formula:

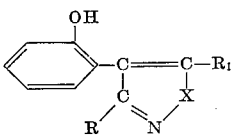

II wherein R, R$_1$ and X have the same meanings as in Formula I, with a substituted ethane of the general formula:

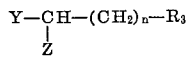

wherein Y is bromine or chlorine, R$_3$ is dimethylamino, diethylamino or di-n-butylamino and Z is H or CH$_3$ when n equals 1, and Z is H when n equals 2.

The alkali-metal salt of the compounds of Formula II may be prepared by reaction, in a lower alcohol medium, of the latter compounds with an alkali-metal hydroxide such as, for example, potassium or sodium hydroxide.

The compounds of Formula II are novel compounds and can be prepared by reacting a benzofuran derivative of the general formula:

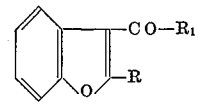

III wherein R and R$_1$ have the same meaning as in Formula I, with an amine compound of the general formula NH$_2$—XH wherein X has the same meaning as in Formula I. The reaction is preferably carried out in an organic medium such as ethyl or methyl alcohol.

Some of the benzofuran starting compounds of Formula III are known compounds, and are described in our United States Patent No. 3,012,042. Those which are new compounds can be prepared by the process disclosed in our aforesaid patent.

The bases of Formula I can be converted into the corresponding pharmaceutically acceptable acid addition salts thereof by treatment with an excess of the desired acid, for example, by treating the base with an alcoholic or ethereal solution of the desired acid, which may be for example hydrochloric acid.

The compounds of the invention have been found to possess useful pharmacological properties. Some of them have been found to exhibit in the animal body anti-inflammatory, anti-oedematous or analgesic activity as well as an effect upon capillary fragility and permeability. More particularly, certain compounds of the invention have been found to possess very valuable properties as spasmolytic agents, exerting both a direct muscle relaxant effect and an anticholinergic action.

The results of the various activity tests carried out with compounds of the invention are described as follows:

ANTI-INFLAMMATORY AND ANTI-OEDEMATOUS ACTIVITY

The following table provides an indication of the anti-inflammatory and anti-oedematous activity of certain compounds falling within the scope of general Formula I when R$_2$ is β-N-diethylaminoethyl:

| X | R | R$_1$ | Salt | Local formol-induced oedema (l.) AD$_{50}$ (mg./kg.) |
|---|---|---|---|---|
| NH | Ethyl | 4-methoxyphenyl | di-HCl | 62 |
| NH | do | 2-methoxyphenyl | di-HCl | 62 |
| NH | do | Methyl | di-HCl | 81 |
| NH | do | Phenyl | di-HCl | 62 |
| NH | n-Butyl | 4-methoxyphenyl | di-HCl | 47 |
| NH | Ethyl | n-Butyl | 2/3 oxalate | 81 |
| N—CH$_3$ | do | 4-methoxyphenyl | di-HCl | 62 |

(1) Local formol-induced oedema: The values given as AD 50 express the doses of active substance which, after intraperitoneal injection, reduce by 50% the oedema produced in the back paw of the rat by injection of 0.2 ml. of a 10% formol solution under the plantar aponeurosis of the paw in question.

ANALGESIC ACTIVITY

The analgesic effect was measured by electrical stimulation of the rectal mucous membrane of rats. Under these experimental conditions it was found, for example, that the analgesic action exerted by:

5-(4-methoxyphenyl)-4-(2 - β - N - diethylaminoethoxyphenyl)-3-ethyl-pyrazole dihydrochloride was ten times that of N-acetyl salicylamide.

ACTIVITY ON CAPILLARY FRAGILITY AND PERMEABILITY

The prophylactic or curative effect on capillary fragility was assessed by measuring manometrically the capillary resistance of rats on a diet, deficient in vitamin P-like factors, to which a determined percentage of active substance was added either prophylactically before institution of the fragilization-action or curatively after institution of the fragilization-action.

For example, it was found that, when using 5-(4-methoxyphenyl)-4-(2-$\beta$-N - diethylaminoethoxyphenyl)-3-ethyl-pyrazole dihydrochloride, the prophylactic action was obtained by incorporating in the deficiency diet 0.25% of the pyrazole salt, namely at least ten times less than the dose of hesperidin methyl chalcone required to produce the same effect; the curative action was obtained by incorporating in the deficiency diet 0.5% of the pyrazole salt which is equal to one-twentieth of the required hesperidin methyl chalcone dose.

The effect on capillary permeability was assessed by electro-reflectometric measurement of the trypan blue diffusion spots on the depilated dorsal surface of rats before and after intraperitoneal injection of the active substance. The following table shows the results obtained with certain compounds of the invention in which $R_2$ is $\beta$-N-diethylaminoethyl. These results are expressed in comparison with the action exerted by hesperidin methyl chalcone (HMC) regarded as unity. All the compounds of the invention so tested were used in the dihydrochloride form:

| X | R | $R_1$ | Effect on permeability (HMC=1) |
|---|---|---|---|
| NH | Ethyl | 4-methoxyphenyl | 8 |
| NH | do | Methyl | 5.6 |
| NH | do | 3,4,5-trimethoxyphenyl | 9.6 |
| NH | do | Phenyl | 9.6 |
| NH | n-Butyl | 4-methoxyphenyl | 16 |
| NH | Ethyl | 2-methoxyphenyl | 6.4 |
| N-methyl | do | 4-methoxyphenyl | 8 |

SPASMOLYTIC ACTIVITY

Spasmolytic activity was demonstrated in vitro on the ileum of the guinea pig by registering the amount of substance required to suppress the spasm produced by a particular quantity of histamine.

The spasmolytic action thus observed was measured in relation to the action of a known spasmolytic agent, namely papaverine. The following table illustrates the relative activity values of a certain number of the substances of the invention as compared with that of papaverine which is regarded as unity. Compounds 1 to 10 were used in the dihydrochloride form, while compounds 11 and 13 were dioxalates and compound 12 a mono-oxalate.

Spasmolytic effect in vitro (Papaverine=1)

| No. | X | R | $R_1$ | $R_2$ | Effect |
|---|---|---|---|---|---|
| 1 | NH | Ethyl | 4-methoxyphenyl | $\beta$-N-diethylaminoethyl | 30 |
| 2 | NH | do | Methyl | do | 20 |
| 3 | NH | do | 3,4,5-trimethoxyphenyl | do | 5 |
| 4 | NH | do | Phenyl | do | 20 |
| 5 | NH | Butyl | 4-methoxyphenyl | do | 25 |
| 6 | NH | Ethyl | 2-methoxyphenyl | do | 4 |
| 7 | N-CH$_3$ | do | 4-methoxyphenyl | do | 10 |
| 8 | NH | Phenyl | Methyl | do | 100 |
| 9 | NH | Benzyl | do | do | 10 |
| 10 | NH | Phenyl | do | $\beta$-N-dimethylaminoethyl | 20 |
| 11 | NH | do | do | $\beta$-N-di-n-butylaminoethyl | 10 |
| 12 | NH | do | do | $\beta$-N-di-n-butylaminoisopropyl | 9 |
| 13 | NH | do | do | $\gamma$-N-dimethylaminopropyl | 13 |

The spasmolytic activity thus observed in vitro was confirmed in vivo by measuring the quantity of substance necessary, when administered by injection into the jugular vein of the guinea pig, to produce 50% inhibition of intestinal spasm provoked by intraperitoneal perfusion of an aqueous solution of barium chloride. This spasmolytic action was also registered in relation to the corresponding activity of papaverine. In accordance with the technique described, it was found, for example, that the following substances:

5-(4-methoxyphenyl)-4-(2 - $\beta$ - N - diethylaminoethoxyphenyl)-3-ethyl-pyrazole dihydrochloride 5-phenyl-4-(2-$\beta$-N-diethylaminoethoxyphenyl)-3 - ethyl-pyrazole dihydrochloride 5-methyl-4-(2-$\beta$-N-diethylaminoethoxyphenyl)-3 - phenyl-pyrazole dihydrochloride 5-methyl-4-(2-$\beta$ - N - dimethylaminoethoxyphenyl) - 3-phenyl-pyrazole dihydrochloride exerted a spasmolytic effect which was respectively twice, seven times, twenty times and forty times that of papaverine.

When a variety of spasmogenics were employed, comprising in addition to barium chloride, such agents as histamine, Pituitrin, acetylcholine and Prostigmine, it was found that the papaverine-type suppressive action in vivo on intestinal hypermotility or spasm of 5-methyl-4-(2-$\beta$-N-diethylaminoethoxyphenyl) - 3 - phenyl - pyrazole dihydrochloride was, on the average, ten times that of papaverine while the atropinic properties of the pyrazole in question was only one-thirtieth of those of atropine itself.

It has also been observed that 5-methyl-4-(2-$\beta$-N-diethylaminoethoxyphenyl)-3 - phenyl - pyrazole dihydrochloride is capable of suppressing spasms of the isolated gall bladders of guinea pigs. When administered intravenously to dogs, in a dose of 1 mg./kg., this substance considerably reduces the pressure required to open Oddi's sphincter. Furthermore, it has been found, in tests carried out both on the isolated fallopian tubes of rats and the uterus in situ of cats, that it lowers normal uterine tonicity for a prolonged period and diminishes for a much longer time than papaverine, hypertonicity produced by Pituitrin without, however, influencing to any appreciable degree the rhythm and amplitude of the uterine contractions. Finally, the substance has been found to suppress, in a lasting manner, spasms of the ureter provoked in vivo in dogs.

Of the examples given hereunder, Examples 1, 2 and 3 illustrate the process of preparation of the 4-(2-hydroxyphenyl)-substituted starting-products corresponding to Formula II above, while Example 4 provides a non-limitative illustration of the method of preparation of the substances of the invention.

Example 1

PREPARATION OF 5-(4-METHOXYPHENYL)-4-(2-HYDROXYPHENYL)-3-ETHYL-PYRAZOLE 28 g. of 2-ethyl-3-anisoyl-benzofuran were dissolved in 175 ml. of absolute alcohol in a 0.5 liter flask. To this solution were added 10.5 g. of sodium bicarbonate, 6.1 ml. of 100% hydrazine hydrate and 4.5 ml. of water. The mixture was heated for at least 8 hours under reflux, cooled, and poured into water which had been slightly acidified with acetic acid. An oily precipitate appeared which rapidly solidified. The precipitate was filtered off and dried, after which it was recrystallized from a benzene/petroleum ether mixture (30/40) to give the desired product, M.P. 154–155° C. (yield 98%).

Different variations may be introduced into the above process. For example, the oily precipitate may be purified by extraction with benzene, followed by washing out of the benzene solution with a 5% solution of potassium hydroxide and acidification of the alkaline extract with acetic acid. In another variation, the sodium bicarbonate may be omitted with only a slight loss of yield.

By using the process described in Example 1, the following pyrazoles have been prepared:

|  | Melting point, °C. |
|---|---|
| 5-methyl-4-(2-hydroxyphenyl)-3-ethyl-pyrazole from 2-ethyl-3-acetyl-benzofuran (hydrochloride) | 192–194 |
| 5-(2-methoxyphenyl)-4-(2-hydroxyphenyl)-3-ethyl-pyrazole from 2-ethyl-3-(2-methoxy-benzoyl)-benzofuran (hydrochloride) | 245–249 |
| 5-(3,4,5-trimethoxyphenyl)-4-(2-hydroxyphenyl)-3-ethyl-pyrazole from 2-ethyl-3-(3,4,5-trimethoxy-benzoyl)-benzofuran | 167–168 |
| 5-phenyl-4-(2-hydroxyphenyl)-3-ethyl-pyrazole from 2-ethyl-3-benzoyl-benzofuran | 129–131 |
| 5-(4-methoxyphenyl)-4-(2-hydroxyphenyl)-3-n-butyl-pyrazole from 2-n-butyl-3-anisoyl-benzofuran | 164–165 |
| 5-(4-methoxyphenyl)-4-(2-hydroxyphenyl)-3-methyl-pyrazole from 2-methyl-3-anisoyl-benzofuran | 175–176 |
| 5-(4-methoxyphenyl)-4-(2-hydroxyphenyl)-3-benzyl-pyrazole from 2-benzyl-3-anisoyl-benzofuran | 181–182 |

Example 2

PREPARATION OF 1-METHYL-5-(4-METHOXYPHENYL)-4-(2-HYDROXYPHENYL)-3-ETHYL-PYRAZOLE

In a 1 liter flask, 28 g. of 2-ethyl-3-anisoyl-benzofuran were dissolved in 425 ml. of absolute alcohol. A suspension of 26.4 g. of anhydrous sodium carbonate in 70 ml. of water was prepared, to which were added 18 g. of methylhydrazine sulfate and the resulting mixture was poured into the alcohol solution which was then heated for at least 8 hours under reflux.

The reaction product was then cooled and poured into water slightly acidified with acetic acid. This was followed by extraction with ether, after which the ethereal phase was washed with a 5% aqueous solution of potassium hydroxide. The alkaline solution was acidified with acetic acid and the solid precipitate was filtered off and dried, after which it was recrystallized from a benzene/petroleum ether mixture to give the desired product, M.P. 162–163° C. (yield 71%).

Example 3

PREPARATION OF 5-METHYL-4-(2-HYDROXYPHENYL)-3-PHENYL-PYRAZOLE

To a flask, fitted with a stirrer and containing a solution of 97.1 g. of 2-phenyl benzofuran in 550 ml. of methylene chloride were added 51 g. of acetyl chloride. The solution was cooled to between 0° C. and −5° C. and, while stirring, 156.3 g. of tin tetrachloride were added dropwise. Stirring was continued at the same temperature for two hours and then for one hour at 20° C. The complex so formed was decomposed by means of 300 ml. of a 33% aqueous solution of hydrochloric acid, care being taken to maintain the temperature at between 0° C. and 10° C. The aqueous phase was eliminated and the organic phase washed with distilled water, then with a solution of sodium bicarbonate and finally with water. After drying the organic phase over sodium sulfate, the methylene chloride was distilled off leaving 118.6 g. of 2-phenyl-3-acetyl-benzofuran, in the form of an impure oil, which was then placed in a flask fitted with a reflux condenser. To this oil were added 625 ml. of ethyl alcohol and 37.5 g. of hydrazine hydrate. The solution so obtained was heated under reflux for forty-eight hours, cooled and poured into 1750 ml. of water. To this mixture was added 1000 ml. of benzene and a phenolic fraction was recovered from the benzene solution by treating the latter five times with a 2.5% solution of potassium hydroxide. The aqueous basic phase remaining was stirred for ten minutes at 20° C. with 5 g. of active charcoal, filtered and acidified, while gently stirring, by means of a 25% solution of hydrochloric acid. The phenolic pyrazole precipitated, the pH of the solution was adjusted to about 7.5 with sodium bicarbonate and the pyrazole filtered off and dried. In this way, 60.6 g. of 5-methyl-4-(2-hydroxyphenyl)-3-phenyl-pyrazole were obtained, M.P. 160° C.–161° C. (yield 48.4%).

The 5-methyl-4-(2-hydroxyphenyl)-3-phenyl-pyrazole can also be obtained in accordance with the process described in Example 1. In this case, it is first necessary to purify the 2-phenyl-3-acetyl-benzofuran used as the starting product, for example, in accordance with the method described by A. S. Angeloni and M. Tramontini in the Bolletino Scientifico della Facolta di Chimica Industriale, Bologna, vol. XXI, page 243, 1963.

Example 4

PREPARATION OF 5-METHYL-4-(2-β-N-DIETHYLAMINO-ETHOXYPHENYL)-3-PHENYL-PYRAZOLE AND ITS DIHYDROCHLORIDE

A solution of 16.5 g. of potassium hydroxide (85%) in a mixture of 150 ml. of methyl alcohol and 20 ml. of water was placed in a flask fitted with a stirrer. A second solution comprising 62.6 g. of 5-methyl-4-(2-hydroxyphenyl)-3-phenyl-pyrazole, prepared from 2-phenyl-3-acetyl-benzofuran as described in Example 3, in 150 ml. of methyl alcohol was prepared and added in one operation to the first solution.

Separately, 17.3 g. of potassium hydroxide (85%) were dissolved in 125 ml. of methyl alcohol and to the resultant solution were added 45.2 g. of 2-chloro-1-N-diethylaminoethane hydrochloride dissolved in 125 ml. of methyl alcohol. This latter solution was poured into the flask containing the solution previously prepared.

The contents of the flask were stirred for 24 hours at 20° C. and then poured into water and extracted with ether. The ethereal solution was washed with a 2.5% solution of potassium hydroxide, then with water, after which it was dried and the ether evaporated. In this way, 76.9 g. of 5-(methyl)-4-(2-β-N-diethylaminoethoxyphenyl)-3-phenyl-pyrazole was obtained in the form of an oil, which was converted to the dihydrochloride. The latter was recrystallized from an ethyl alcohol/ethyl acetate mixture. Yield in dihydrochloride: 64.1 g., i.e., 60.6%; M.P. of the dihydrochloride: 219–221° C.

As a variation of the above, the methyl alcohol employed can be replaced by ethyl alcohol without any loss of yield.

By the process described in Example 4, the following compounds have been prepared:

|  | Melting point, °C. |
|---|---|
| 5-(2-methoxyphenyl)-4-(2-β-N-diethylaminoethoxyphenyl)-3-ethyl-pyrazole from 5-(2-methoxyphenyl)-4-(2-hydroxyphenyl)-3-ethyl-pyrazole (dihydrochloride) | 189–191 |
| 5-methyl-4-(2-β-N-diethylaminoethoxyphenyl)-3-ethyl-pyrazole from 5-methyl-4-(2-hydroxyphenyl)-3-ethyl-pyrazole (dihydrochloride) | 188–190 |
| 5-(3,4,5-trimethoxyphenyl)-4-(2-β-N-diethylaminoethoxyphenyl)-3-ethyl-pyrazole from 5-(3,4,5-trimethoxyphenyl)-4-(2-hydroxyphenyl)-3-ethyl-pyrazole (dihydrochloride) | 210–212 |
| 5-phenyl-4-(2-β-N-diethylaminoethoxyphenyl)-3-ethyl-pyrazole from 5-phenyl-4-(2-hydroxyphenyl)-3-ethyl-pyrazole (dihydrochloride) | 165–168 |
| 5-(4-methoxyphenyl)-4-(2-β-N-diethylaminoethoxyphenyl)-3-n-butyl-pyrazole from 5-(4-methoxyphenyl)-4-(2-hydroxyphenyl)-3-n-butyl-pyrazole (dihydrochloride) | 176–178 |
| 1-methyl-5-(4-methoxyphenyl)-4-(2-β-N-diethylaminoethoxyphenyl)-3-ethyl-pyrazole from 1-methyl-5-(4-methoxyphenyl)-4-(2-hydroxyphenyl)-3-ethyl-pyrazole (dihydrochloride) | 170–172 |
| 5-(4-methoxyphenyl)-4-(2-β-N-diethylaminoethoxyphenyl)-3-ethyl-pyrazole from 5-(4-methoxyphenyl)-4-(2-hydroxyphenyl)-3-ethyl-pyrazole (dihydrochloride) | 196–198 |
| 5-(4-methoxyphenyl)-4-(2-β-N-diethylaminoethoxyphenyl)-3-methyl-pyrazole from 5-(4-methoxyphenyl)-4-(2-hydroxyphenyl)-3-methyl-pyrazole (dihydrochloride) | 216–218 |
| 5-methyl-4-(2-β-N-diethylaminoethoxyphenyl)-3-benzyl-pyrazole from 5-methyl-4-(2-hydroxyphenyl)-3-benzyl-pyrazole (dihydrochloride) | 106–109 |

By the same process, but employing different halogenoaminoalkanes the following compounds have been prepared:

| | Melting point, °C. |
|---|---|
| 5-methyl-4-(2-β-N-dimethylaminoethoxyphenyl)-3-phenyl-pyrazole from 5-methyl-4-(2-hydroxyphenyl)-3-phenyl-pyrazole and 2-chloro-1-N-dimethylaminoethane (dihydrochloride) | 242–246 |
| 5-methyl-4-(2-β-N-di-n-butylaminoethoxyphenyl)-3-phenyl-pyrazole from 5-methyl-4-(2-hydroxyphenyl)-3-phenyl-pyrazole and 2-chloro-1-N-di-n-butylaminoethane (dioxalate) | 110–113 |
| 5-methyl-4-(2-β-N-di-n-butylaminoisopropoxyphenyl)-3-phenyl-pyrazole from 5-methyl-4-(2-hydroxyphenyl)-3-phenyl-pyrazole and 2-chloro-2-methyl-1-N-di-n-butylaminoethane (oxalate) | 110–112 |
| 5-methyl-4-(2-γ-N-dimethylaminopropoxyphenyl)-3-phenyl-pyrazole from 5-methyl-4-(2-hydroxyphenyl)-3-phenyl-pyrazole and 3-chloro-1-N-dimethylaminopropane (dioxalate) | 167–169 |

What is claimed is:
1. A pyrazole derivative represented by the formula:

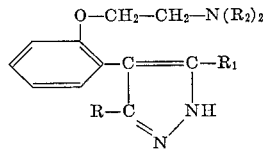

wherein R is selected from the group consisting of ethyl and phenyl, $R_1$ is selected from the group consisting of methyl and 4-methoxyphenyl and $R_2$ is selected from the group consisting of methyl and ethyl.

2. A pharmaceutically acceptable acid addition salt of the derivatives claimed in claim 1.
3. A pyrazole derivative as claimed in claim 1 wherein R is ethyl, $R_1$ is 4-methoxyphenyl and $R_2$ is ethyl.
4. A pharmaceutically acceptable acid addition salt of the derivative of claim 3.
5. A pyrazole derivative as claimed in claim 1 wherein R is phenyl, $R_1$ is methyl and $R_2$ is ethyl.
6. A pharmaceutically acceptable acid addition salt of the derivative of claim 5.
7. A pyrazole derivative as claimed in claim 1 wherein R is phenyl, $R_1$ is methyl and $R_2$ is methyl.
8. A pharmaceutically acceptable acid addition salt of the derivative of claim 7.

References Cited
UNITED STATES PATENTS 2,721,143  10/1955  Kraft et al.
2,946,765  7/1960  Ross et al.

OTHER REFERENCES

Descamps et al., Bul. Soc. Chim. Belges, vol. 73, pp. 459–67 and 470–77 relied on (1964), QDI, S39. Copy in P.O.S.L.

HENRY R. JILES, *Primary Examiner.*

NATALIE TROUSOF, *Assistant Examiner.*